United States Patent [19]

Epsztein et al.

[11] Patent Number: 4,517,603
[45] Date of Patent: May 14, 1985

[54] DEVICE FOR PRODUCING TELEVISED PICTURES WITH A CHARGE TRANSFER MATRIX

[75] Inventors: Bernard Epsztein; Lucien Guyot, both of Paris, France

[73] Assignee: Thomson-CSF, Paris, France

[21] Appl. No.: 360,699

[22] Filed: Mar. 22, 1982

[30] Foreign Application Priority Data

Mar. 27, 1981 [FR] France .................. 81 06188

[51] Int. Cl.$^3$ .......................................... H04N 1/028
[52] U.S. Cl. ................................ 358/213; 358/241
[58] Field of Search .................. 358/213, 241, 65, 69

[56] References Cited

U.S. PATENT DOCUMENTS 3,220,012 11/1965 Schwertz ..................... 358/241
4,319,284 3/1982 Kiess ........................... 358/213

OTHER PUBLICATIONS

Real-Time Image Enhancement using 3×3 Pixel Neighborhood Operator Functions, by J. Hall, et al., SPIE vol. 207 Applications of Digital Image Processing III (1979), pp. 135–141.

Primary Examiner—Tommy P. Chin
Attorney, Agent, or Firm—Roland Plottel

[57] ABSTRACT

A device for producing televised pictures with a high degree of resolution comprises a photosensitive matrix which receives an optical image, and an electromechanical apparatus for displacing the matrix with respect to the optical image formed thereon. The displacement is equal to half the size of an elementary modual, or pixil, defined by the intersection of the lines and columns of the matrix.

5 Claims, 3 Drawing Figures

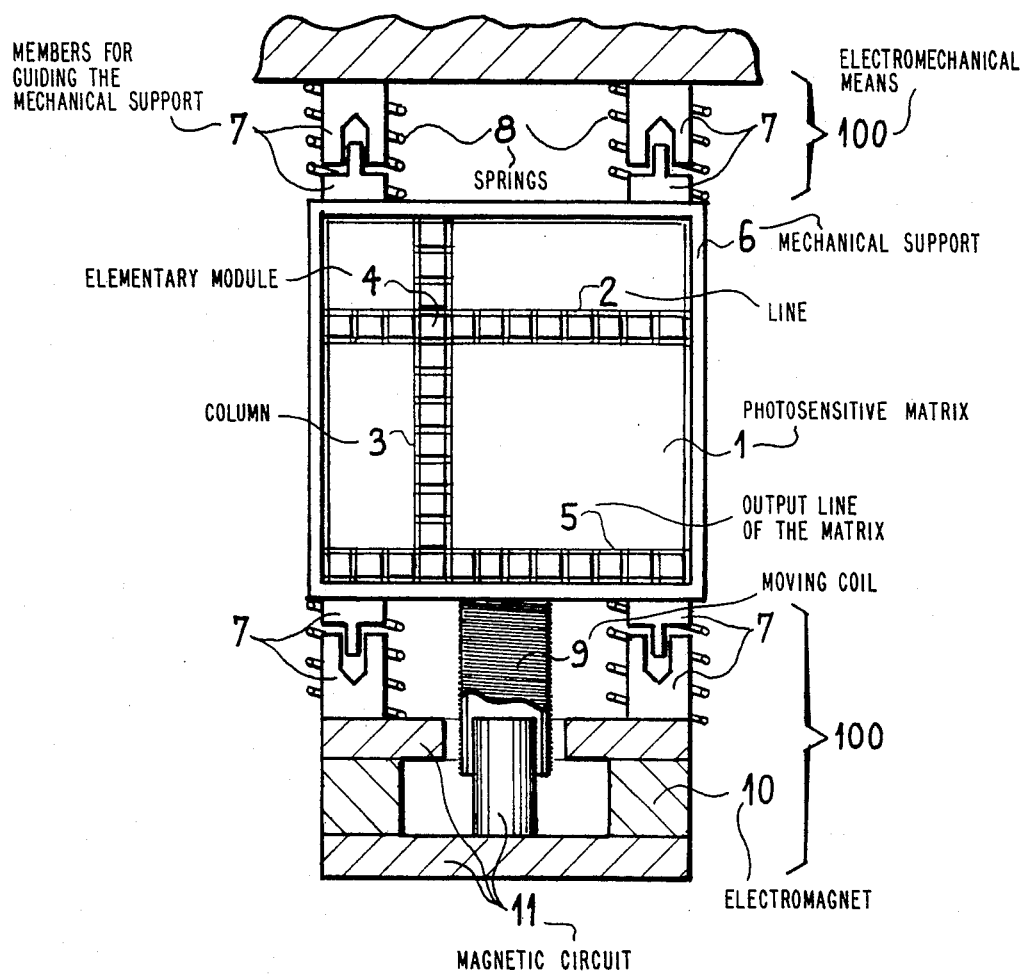

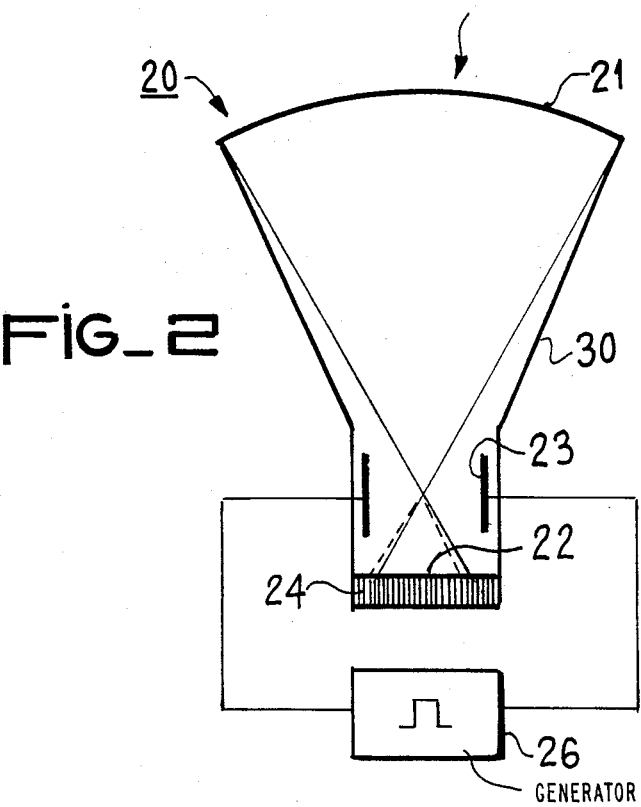
FIG_2
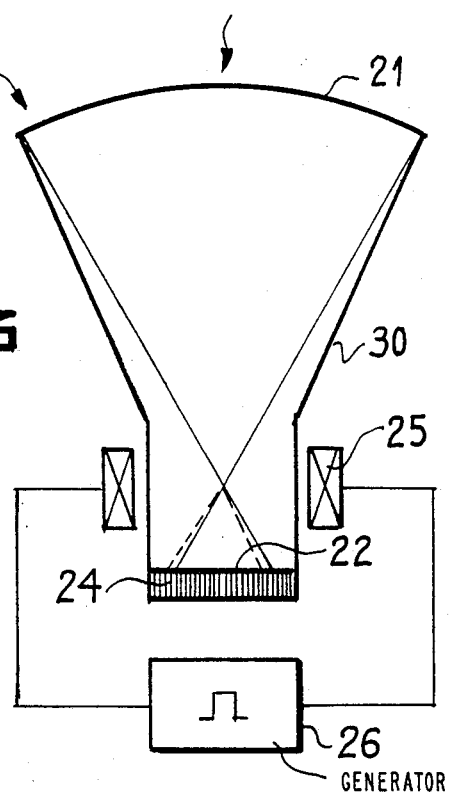
FIG_3

DEVICE FOR PRODUCING TELEVISED PICTURES WITH A CHARGE TRANSFER MATRIX

BACKGROUND OF THE INVENTION

The present invention relates to a device for producing televised pictures having charge transfer matrixes.

At present a television picture is analyzed by an "interlaced line scan" of the matrix, whereby a picture is subdivided into two half-pictures obtained by successive scans of alternate lines of the matrix. To obtain a good picture resolution, it is necessary to increase the number of pixels (picture elements) or elementary modules formed by the intersection of lines and columns of the matrix. As it is either difficult or impossible to reduce the dimensions of the elementary module or pixel, the increase in the number of pixels inevitably leads to an increase in the probability of errors being present, due to a necessarily larger semiconductor surface area, so that the efficiency of production is reduced and production costs are very high.

BRIEF SUMMARY OF THE INVENTION

The present invention makes it possible to reduce at least by half the number of pixels of the matrix necessary for obtaining a given picture resolution.

For this purpose the invention provides for a relative displacement of the matrix with respect to the optical image of a distance equal to e.g. a video image line, in such a way that the second video half-picture obtained in the prior art by scanning lines inserted between those scanned for obtaining the first half-picture is obtained by scanning the same lines as those scanned for obtaining the first half-picture, said lines having undergone a vertical displacement equal to half the vertical pitch of the matrix. The resulting vertical resolution of such a matrix is significantly higher than that of a conventional matrix (up to double).

The present invention also provides for a horizontal displacement of the matrix.

What has been described hereinbefore is generally applicable to all systems aiming at the formation of an image or picture by scanning a system of points, no matter in which way the said image was initially produced and the path followed by the information of its points in its transfer to the final image, given by a spatially periodic structure or matrix of reading elements. The invention is applicable to all these images or pictures, which are described by the general term televised pictures.

One of these cases refers to X-ray, visible or infrared radiation brightness amplifiers, which will be further defined hereinafter by examples.

In this case the picture is detected by a photocathode (after being transformed into visible rays in the case of X-rays) and transferred by electrons up to a fluorescent screen or reading target. In the case of a screen, the light picture obtained is taken up either by a conventional optical system, or an optical fibre flat coil, which forwards it to a vidicon having a target, or to a photodiode or charge transfer photosensitive matrix.

The device according to the invention comprises a photosensitive matrix for example a charge-transfer photosensitive matrix, formed by a system of equidistant lines and columns, whose intersection defines elementary modules, and associated means for forming an optical image on said matrix, wherein it also comprises means ensuring a relative displacement of the matrix with respect to the optical image by a distance equal to half the size of an elementary module, defined in the direction of the said displacement.

BRIEF DESCRIPTION OF THE DRAWINGS

The invention is described in greater detail hereinafter relative to non-limitative embodiments and the attached drawings, wherein show:

FIG. 1 is a schematic drawing partially in section showing one embodiment of the device of the present invention.

FIG. 2 is a schematic diagram showing a second embodiment.

FIG. 3 is a schematic diagram showing a third embodiment.

DETAILED DESCRIPTION OF THE PREFERRED EMBODIMENTS

The invention more particularly applies to line store matrixes constituted by an alteration of photosensitive columns and memory columns, the elements of the first discharging into the corresponding elements of the second at the end of a half-picture, the elements of the latter discharging successively into the matrix output line during the following half-picture.

The invention can also apply to frame memory matrixes comprising an upper half formed from photosensitive elements and a lower half formed from memory elements. The information detected by the photosensitive elements is transferred vertically to the memory elements and then into output line of the matrix.

For reasons of clarity, only one line and one column of the matrix is shown in FIG. 1. The following description applies both to line memory matrixes and to frame memory matrixes.

The means making it possible to displace the matrix in its plane in a vertical direction, the latter being defined as that of the picture, can be electromechanical means, e.g. a linear electromagnetic motor, a bistable system or any other means permitting a displacement of the matrix, such that the latter remains fixed during a half-picture, i.e., for 20 ms (corresponding to the European standard which is 25 pictures per second), moves vertically for one line, i.e. by the height of a half-pixel during the picture return, remains fixed during the following half-picture, returns to its initial position during the picture return and then recommences the preceding cycle. These displacements must be of a very limited amplitude of approximately 10 to 15$\mu$. The corresponding speeds are a few cm/sec and the accelerations do not exceed a fraction of g, whilst the necessary power levels are also low.

The displacement covered by the present invention can be that of the optical image relative to the photosensitive matrix. In this case, the means for performing such a displacement can be optical means actuated by an electromechanical device, such as an oscillating mirror, prism, optical flat, etc. or purely optical means using materials of e.g. the ferroelectric type interposed on the optical path. The transmission characteristics of these materials are directly dependent on an electric signal, or an electric or magnetic field.

The means shown in FIG. 1 are electromechanical means, of the electromagnetic motor type, permitting a displacement of the photosensitive matrix relative to the optical image.

Reference numeral 1 indicates the photosensitive matrix in which is shown a line 2 and a column 3 of photosensitive elements, the intersection of a line and a column defining an elementary module or pixel 4, as well as the output line of the matrix at 5.

The photosensitive matrix is surrounded by a mechanical support 6 guided by members 7, which also act as end-of-travel stops for limiting the total displacement of the matrix to a scanning half-line. Support 6 is subject to a restoring force supplied by springs 8, whose rigidity determines with the moving mass the resonant frequency of the system, which must be sufficiently high for the displacement of the matrix to take place in less than about 2 μs.

Support 6 is also subject to an exciting force supplied by a moving coil 9 immersed in a radial magnetic field produced by an electromagnet 10 and concentrated by a magnetic circuit 11, a not shown, square signal generator controls the system. The group of elements 7, 8, 9, 10, and 11 constitutes the electromechanical means 100.

The repetition frequency of such a system is the same as that of the picture, namely 25 pictures per second for the European standard and 30 pictures per second for the U.S. standard. Thus, the number of sampling points along a vertical line is doubled compared with the prior art, which considerably reduces the aliasing effect (which occurs when it is no longer possible to reconstitute the original image on the basis of samples, when there are a limited number of the latter).

The present invention also provides for a horizontal relative displacement of the photosensitive matrix with respect to the optical image.

However, it is not possible to horizontally interlace the signals of two successive half-pictures and the horizontal definition remains unchanged. However, the human eye benefits to a certain extent from the supplementary information provided. To bring about a horizontal movement displacing the matrix with respect to the picture by a horizontal half-cell, it is merely necessary to associate the thus obtained half-picture with line supersync signals subject to a time delay equal to the scan time of a half-cell for reconstituting a more fixed picture. This movement is associated with the preceding movement by summating the two displacement vectors. It can be obtained in practice by obliquely arranging the motor in the direction of the diagonal of four adjacent pixels.

In the case of brightness amplifiers, one of the elements present on the path of the information has, as heretofore, a regular bidimensional periodic structure, such as a reading target constituted by a system of diodes in the case of silicon targets, a system of optical fibres in the case of a flat coil, photosensitive matrix, etc.

However, whereas in the previous embodiment the relative displacement of the picture and the periodic structure was easily brought about by displacing the matrix by using mechanical means, the picture remaining fixed, such a displacement becomes extremely difficult or even impossible when the periodic structure is fixed to other parts of the device, as is the case with an optical fibre board rigidly connected to the brightness amplifier against the output screen to which it is applied in the envelope 30 of the tube. It is then much easier to move the electron beam relative to the board. Such an arrangement is covered by FIGS. 2 and 3, which show two variants thereof.

In FIGS. 2 and 3, reference numeral 20 designates in an overall manner as image converter/brightness amplifier, whose photocathode is 21 and whose output cathodoluminescent screen is 22. As is known, the photocathode is optionally preceded by a not shown scintillator for converting incident radiation. An optical fibre flat coil 24, applied to the screen, transmits to another, not shown, periodic structure placed in front of the tube at the bottom of the drawing, the picture formed on the screen 22 and which constitutes a replica of the electronic image given by the photocathode 21 of the incident radiation arriving at the top of the drawing.

In the variant of FIG. 2. it is an electric field established at the terminals of a system of deflection plates 23 which alternately displaces by the desired quantity, the impact on screen 22 of the incident electron beam, defined in the drawings by oblique lines following the end of each half-picture.

In the variant of FIG. 3, it is a magnetic field produced by coils 25, which brings about this displacement between the position represented by unbroken lines to that represented by broken lines.

In both cases the deflection members 23 and 25 are supplied with square-topped pulses by generator 26. Due to the limited amount of deflection which is necessary representing half an elementary module or a few microns, this movement of the beam is not normally accompanied by any significant aberration.

The present invention is applicable to any device for producinhg televised pictures requiring a high degree of resolution.

What is claimed is:

1. A device for producing televised pictures comprising a photosensitive matrix having a system of equidistant lines and columns with elementary modules at the intersection of the lines and columns; means for forming an optical image on said matrix; means for processing signals corresponding to points of the image impinging said elementary modules in accordance with an interlaced line scanning mode in which the points of a first interlaced half of the image are formed, and then the points of a second interlaced half are formed by lines alternating with the first; means for ensuring relative displacement of said image with respect to the matrix by a distance equal to half the width of the elementary module, after the processing of a half-image, and for maintaining in said relative displacement position throughout the processing time of the following half-image and for returning to an initial position after processing said following half-image.

2. A device according to claim 1, wherein the relative displacement is a displacement of the photosensitive matrix relative to the optical image in a direction parallel to the optical image.

3. A device according to claim 1, wherein the relative displacement is a displacement of the photosensitive matrix relative to the optical image, which takes place in a direction perpendicular to that of the optical image.

4. A device according to claim 1, wherein the relative displacement is a displacement of the matrix relative to the optical image, and wherein the means for displacement and for maintaining comprises a moving coil (9) which abuts against a frame (7) integral with the matrix (1) immersed in a magnetic field of an electromagnet (11), and means for supplying the electromagnet (11) with square signals.

5. A device according to claim 1 wherein the optical image is a replica of an electronic image supplied by an electron beam forming an impact on a cathodoluminescent screen of a converter tube, said relative displacement is a displacement of the electronic image relative to the matrix, and wherein said displacement and maintaining and returning means comprises means for displacing the electrons of the beam with respect to the screen, and means for producing an electric or magnetic field on the path of the electron beam in the vicinity of the electron beam impact with the screen, and supply means for applying square signals to said field producing means.

* * * * *